(No Model.) 2 Sheets—Sheet 1.

C. J. MIKESH & H. W. CONANT.
COMBINED EGG TESTER AND REGISTER.

No. 367,542. Patented Aug. 2, 1887.

WITNESSES:
F. McArdle.
C. Sedgwick.

INVENTOR:
C. J. Mikesh
H. W. Conant
BY Munn & Co.
ATTORNEYS.

N. PETERS, Photo-Lithographer, Washington, D. C.

(No Model.) 2 Sheets—Sheet 2.
C. J. MIKESH & H. W. CONANT.
COMBINED EGG TESTER AND REGISTER.
No. 367,542. Patented Aug. 2, 1887.
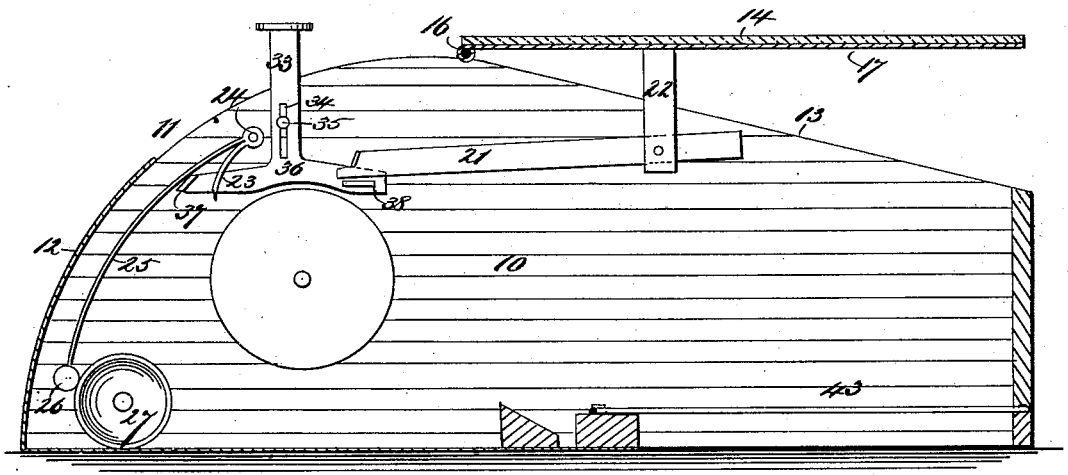
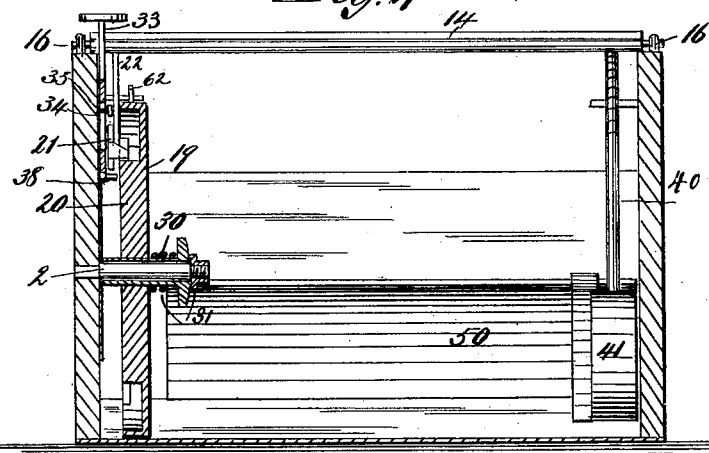
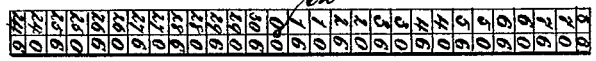
WITNESSES:
F. McArdle.
C. Sedgwick
INVENTOR:
C. J. Mikesh
H. W. Conant
BY Munn & Co
ATTORNEYS.
N. PETERS, Photo-Lithographer, Washington, D. C.

UNITED STATES PATENT OFFICE.

CHARLES J. MIKESH AND HOMER W. CONANT, OF SHELDON, IOWA.

COMBINED EGG TESTER AND REGISTER.

SPECIFICATION forming part of Letters Patent No. 367,542, dated August 2, 1887.

Application filed January 3, 1887. Serial No. 223,225. (No model.)

*To all whom it may concern:*

Be it known that we, CHARLES J. MIKESH and HOMER W. CONANT, of Sheldon, in the county of O'Brien and State of Iowa, have invented a new and Improved Combined Egg Tester and Register, of which the following is a full, clear, and exact description.

This invention relates to a combined egg tester and register, the object of the invention being to provide a cheap, durable, and convenient device wherein the parts shall be so arranged that as the eggs are tested the number of eggs so treated will be automatically indicated by means of a mechanism that is exceedingly simple and not liable to become disarranged, the invention consisting, essentially, of certain combinations and constructions whereby the above-named objects are secured, as will be hereinafter more fully explained, and specifically pointed out in the claims.

Reference is to be had to the accompanying drawings, forming a part of this specification, in which similar figures of reference indicate corresponding parts in all the views.

Figure 1:
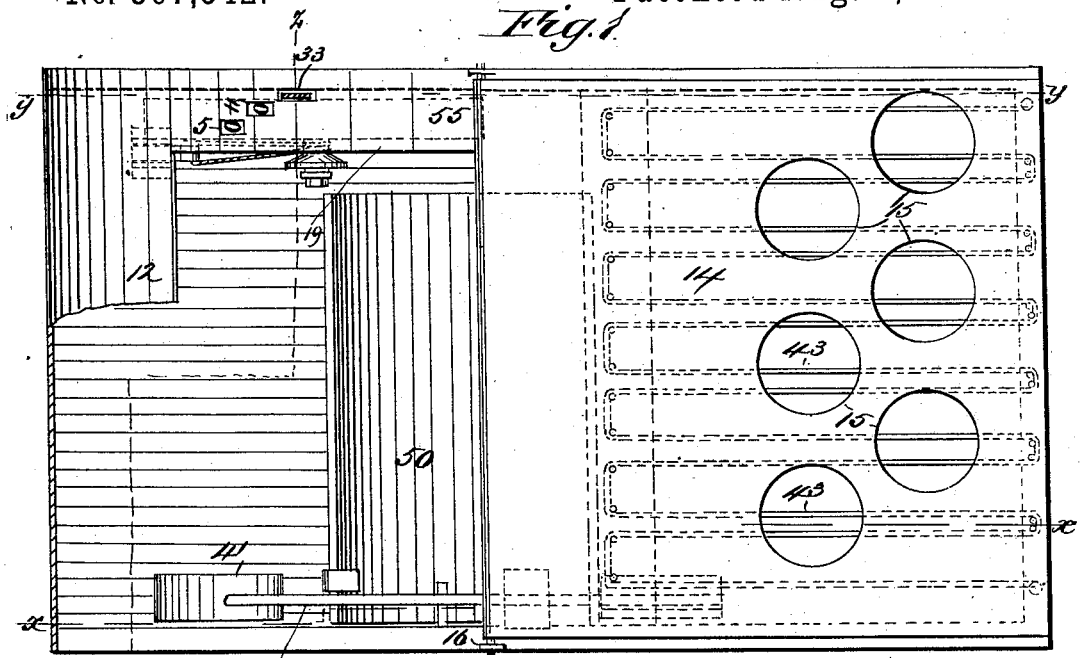
Figure 2:
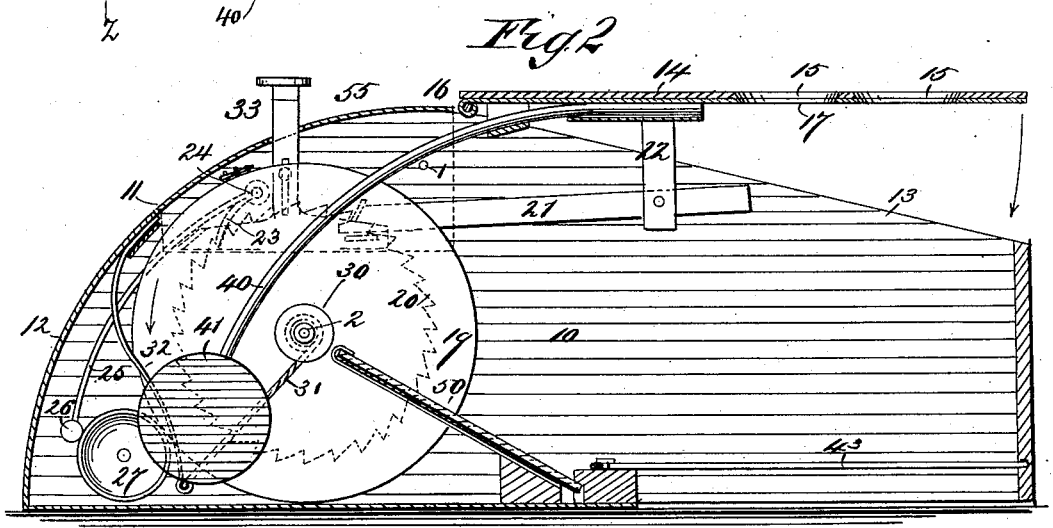

Figure 1 is a plan view of our improved form of egg tester and register, a portion of the sheathing at one end being broken away to disclose the interior construction. Fig. 2 is a longitudinal sectional view taken on the broken line *x x* of Fig. 1. Fig. 3 is a longitudinal sectional view taken on line *y y* of Fig. 1. Fig. 4 is a cross sectional view taken on line *z z* of Fig. 1. Fig. 5 is a view of the registering-wheel, and Fig. 6 is a detail view of a stop arranged in connection with the registering-wheel.

In the drawings, 10 represents a box, made of any proper material, the inside of which is painted black, said box being formed with a curved end, 11, that is partially closed by a shield, 12, and with inclined sections 13, above which there is arranged a cover, 14, said cover being formed with a number of apertures, 15, of which there are preferably six. This cover 14 is hinged to the box 10 at 16, and is lined with black felt or other proper material, as shown at 17, proper apertures being made in the lining, which said apertures register with the apertures of the cover 14.

A wheel, 19, is mounted upon one side of the box, said wheel being supported by an inwardly-extending stud, 2, and upon the peripheral face of this wheel there are arranged two sets of numerals, one set consisting of the numerals from one to thirty, said numerals being arranged in consecutive order, as clearly shown in Fig. 5—that is to say, there is a pair of ones, followed by a pair of twos, that are in turn followed by a pair of threes, and so on up to the final pair upon the wheel. The other set of figures are zeros and sixes, alternately arranged.

The wheel 19 is provided with a ratchet-wheel, 20, said ratchet-wheel being made integral with or rigidly connected to the wheel 19, and the teeth of this ratchet-wheel 20 are engaged by the point of a rod, 21, that is pivotally connected to a downwardly-extending arm, 22, that is secured to the under side of the cover 14, the arrangement being such that when the cover 14 moves to a position to close the box 10 the ratchet-wheel will be forced forward one step; and in order that any retrograde movement of the wheel 19 may be prevented, we provide a pawl, 23, that is pivotally mounted upon a pin, 24, (see Fig. 3,) said pawl being arranged to engage with the teeth of the ratchet-wheel 20, as clearly shown in dotted lines in Fig. 2, the pawl being thrown into engagement with the ratchet-teeth through the medium of a weighted arm, 25, said arm carrying a weight or hammer, 26, that strikes against a bell, 27, when the pawl returns to the position in which it is shown in Fig. 2.

To the hub 30 of the wheel 19 we connect a band, 31, the other end of said band being secured to a spring, 32, that is rigidly connected to the box, the arrangement being such that as the wheel 19 is advanced the band 31 is coiled upon the hub 30, being drawn to said hub against the tension of the spring 32.

In order that the point of the bar 21 and the pawl 23 may be withdrawn from engagement with the ratchet-wheel 20, we provide a manipulating attachment, 33, which consists of a vertical standard formed with a slot, 34, and held to the box 10 by a pivot, 35, which passes through the slot 34, and a horizontal arm, 36, that is formed with flanges 37 and 38, the flange 37 resting just beneath the arm 25, while the flange 38 is arranged just beneath the bar 21, so that if the attachment is drawn upward both the pawl and the rod or bar 21 will be withdrawn from engagement with the ratchet-teeth.

To the hinged end of the cover 14 we attach a downwardly and forwardly extending rod, 40, which carries a weight, 41. The weight is sufficient to hold the door raised, and, the rod 40 resting on the pin 1 on the side of the box, the cover 14 will normally be held in the position in which it is shown in Figs. 2 and 3; but when the eggs are placed so that they will rest within the apertures 15 their combined weight will act to overbalance the weight 41, so that the cover 14 will be thrown downward in the direction of the arrow shown in Fig. 2 to a position to close the box 10, and as the cover so moves downward the rod 21 will act to advance the ratchet-wheel 20 one step forward.

Beneath the cover 14 we arrange flexible bands 43, said bands being made of leather, rubber, or of any other material applicable for such use, the object of these flexible strips or bands being to guard against the breaking of such eggs as may be so small that they will pass through the apertures formed in the cover 14. A mirror, 50, is mounted in about the position shown in the drawings.

In operation the register-wheel 19 is moved to a position so that the numeral 30 of one set of numbers will appear through an aperture, 4, that is formed in a shield, 55, that is arranged to cover said register-wheel, while one of the numerals zero will appear through another aperture, 5, that is formed in said shield. Then, if the usual supply of six eggs be placed upon the cover 14, said cover will drop downward to close the box, when, if a light be held in a proper position, the eggs may be tested in the usual manner, and the ratchet-wheel, and consequently the register-wheel, will be advanced one step forward, so that the numeral zero will appear through the aperture 4 and the numeral six through the aperture 5. When the first charge of eggs are removed, the weight 41 will act to return the cover 14 to its normal position, and when the second charge of eggs is applied the wheel 19 will be advanced one step, so that the numeral 1 will appear through the aperture 4 and a zero will appear through the aperture 5, and this system of registering will be maintained throughout the entire revolution of the wheel 19. As the wheel 19 is revolved the strap 31 will be wound upon its hub against the tension-spring, and after a complete revolution has been made the wheel may be returned to its starting-point by simply raising the manipulating attachment 33, leaving the spring 32 free to act to return the wheel 19 to the commencement of its line of travel, the backward throw of the wheel being limited by a stop, 10, that is preferably in the form of a bell-crank, and pivotally connected to the box 10, being normally held in the position in which it is shown in Fig. 6 by a spring, 51, one arm of this stop projecting outward over the face of the wheel 19 and into the path of a pin, 62, carried by said wheel.

Having thus fully described our invention, we claim as new and desire to secure by Letters Patent—

1. In an egg tester and register, the combination, with a box, of a counterbalanced and apertured cover, a registering-wheel, a ratchet-wheel carried by the registering-wheel, a pawl connected to the said cover and adapted to engage the ratchet-wheel, a bell, a pivoted arm carrying a pawl for engaging the ratchet-wheel to prevent backward movement of the same, and a hammer for engaging the bell, substantially as herein shown and described.

2. In an egg tester and register, the combination, with a box, of a counterbalanced and apertured cover, a registering-wheel, a ratchet-wheel, a pawl connected to the cover and engaging the ratchet-wheel, a bell, a lever carrying a pawl for engaging the ratchet-wheel to prevent backward movement of the same, a hammer for engaging the bell, and means for disengaging the said pawls from the ratchet-wheel, substantially as herein shown and described.

3. In an egg tester and register, the combination, with the box 10, having the inclined sides 13, and the hinged and counterbalanced cover 14, provided with apertures 15, of the registering-wheel 19, ratchet-wheel 20, and the bar 21, pivotally connected to a downwardly-projecting arm of the cover, substantially as herein shown and described.

4. In an egg tester and register, the combination, with a box, 10, and a perforated and counterbalanced cover, 14, of the registering-wheel 19, the ratchet-wheel 20, the bar 21, pivotally connected to an arm on the under side of the cover, a pivoted and weighted arm, 25 26, a bell, 27, and a pawl, 23, carried by said weighted arm, substantially as herein shown and described.

5. In an egg tester and register, the combination, with the bar 21 and the pivoted and weighted arm 25, carrying the pawl 23, of the sliding standard 33, having a horizontal arm, 36, provided with flanges 37 and 38, substantially as herein shown and described.

CHARLES J. MIKESH.
HOMER W. CONANT.

Witnesses:
ED. C. BROWN,
C. H. BROWN.